(12) United States Patent
Tada et al.

(10) Patent No.: US 7,039,636 B2
(45) Date of Patent: May 2, 2006

(54) DOCUMENT RETRIEVAL METHOD AND DOCUMENT RETRIEVAL SYSTEM

(75) Inventors: Katsumi Tada, Kawasaki (JP); Takuya Okamoto, Machida (JP); Natsuko Sugaya, Kawasaki (JP); Tadataka Matsubayashi, Yokohama (JP); Yasuhiko Inaba, Yokohama (JP); Yasushi Kawashimo, Hirakata (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 10/456,519

(22) Filed: Jun. 9, 2003

(65) Prior Publication Data

US 2003/0200211 A1    Oct. 23, 2003

Related U.S. Application Data

(63) Continuation of application No. 09/501,512, filed on Feb. 9, 2000, now abandoned.

(30) Foreign Application Priority Data

Feb. 9, 1999    (JP)    ................ 11-030909

(51) Int. Cl.
    G06F 17/30    (2006.01)
(52) U.S. Cl. .............................. 707/4; 707/3
(58) Field of Classification Search ............... 707/3, 707/5, 6, 4, 104.1; 382/190; 704/7, 9, 277
    See application file for complete search history.

(56) References Cited

U.S. PATENT DOCUMENTS

| | | | |
|---|---|---|---|
| 4,800,522 A | 1/1989 | Miyao et al. ................. | 704/10 |
| 5,651,095 A | 7/1997 | Ogden ........................ | 704/257 |
| 5,706,365 A | 1/1998 | Rangarajan et al. ......... | 707/102 |
| 5,706,496 A * | 1/1998 | Noguchi et al. ............... | 707/3 |
| 5,752,051 A | 5/1998 | Cohen .......................... | 704/1 |
| 6,003,043 A | 12/1999 | Hatakeyama et al. ....... | 707/102 |
| 6,009,424 A | 12/1999 | Lepage et al. ............ | 707/104.1 |
| 6,094,634 A | 7/2000 | Yahagi et al. ................. | 341/90 |
| 6,169,969 B1 | 1/2001 | Cohen ........................... | 704/1 |
| 6,169,999 B1 | 1/2001 | Kanno ......................... | 704/10 |
| 6,226,628 B1 | 5/2001 | Forbes ........................... | 707/1 |

FOREIGN PATENT DOCUMENTS

JP    08194718    7/1996

OTHER PUBLICATIONS (*Information Retrieval) Data Structures & Algorithms by William B. Frakes, Editors: Ricardo Baeza-Yates, Prentice-Hall, 1992, pp. 21-23.

* cited by examiner

*Primary Examiner*—Apu M. Mofiz
(74) *Attorney, Agent, or Firm*—Mattingly, Stanger, Malur & Brundidge, P.C.

(57) ABSTRACT

Word boundary identification operations such as morpheme analysis is performed on documents to be registered, and the top positions and the end positions of words are identified. Word boundary information is obtained based on these identification results. Search indexes are created for substrings of a predetermined length (n-grams) extracted from the document being registered. The search index includes document identification information as well as occurrence position information which indicates that the string is located at the n-th position from the beginning of the text data, and word boundary information for an n-gram in a document.

4 Claims, 12 Drawing Sheets

FIG.10 search term : "電気温水器"

n-gram extraction for seches operation
(step 2000)

search n-grams : "電" "気" "温" "水" "器"

index extraction for searches operation
(step 2001)

search n-gram :                    top-of-word boundary flag
                                    end-of-word boundary flag
                 Did  Pos

"電"   001  4   1  0

"気"   001  5   0  0

"温"   001  6   0  0

"水"   001  7   0  0

"器"   001  8   0  1 free-word search operation (step 2003)
check for search of term
( consecutive Pos in same Did)

search result : Did;001, Pos;4

DOCUMENT RETRIEVAL METHOD AND DOCUMENT RETRIEVAL SYSTEM

The present application is a continuation of application Ser. No. 09/501,512, filed Feb. 9, 2000 ABN, the contents of which are incorporated herein by reference.

BACKGROUND OF THE INVENTION

The present invention relates to a full-text search that performs high-speed retrieval of documents containing specified strings from the full text of large-scale document databases. The present invention is used in databases, document management systems, document filing systems, and DTP (Desktop Publishing) systems.

One method for performing high-speed retrieval of documents containing specified strings from the full text of large-scale document databases is to use an n-gram index.

In the n-gram indexing method, information about the position at which each n-gram (a string consisting of n consecutive characters) occurs in a document is indexed when a document is registered. Using this method, documents in which a search term appears are found as follows. When a search is performed, the n-grams contained in the search term are looked up in the index, and an evaluation is made to see whether the positional relations within the search term match the positional relations in the index (this is referred to hereinafter as an adjacency evaluation).

Figure 2:
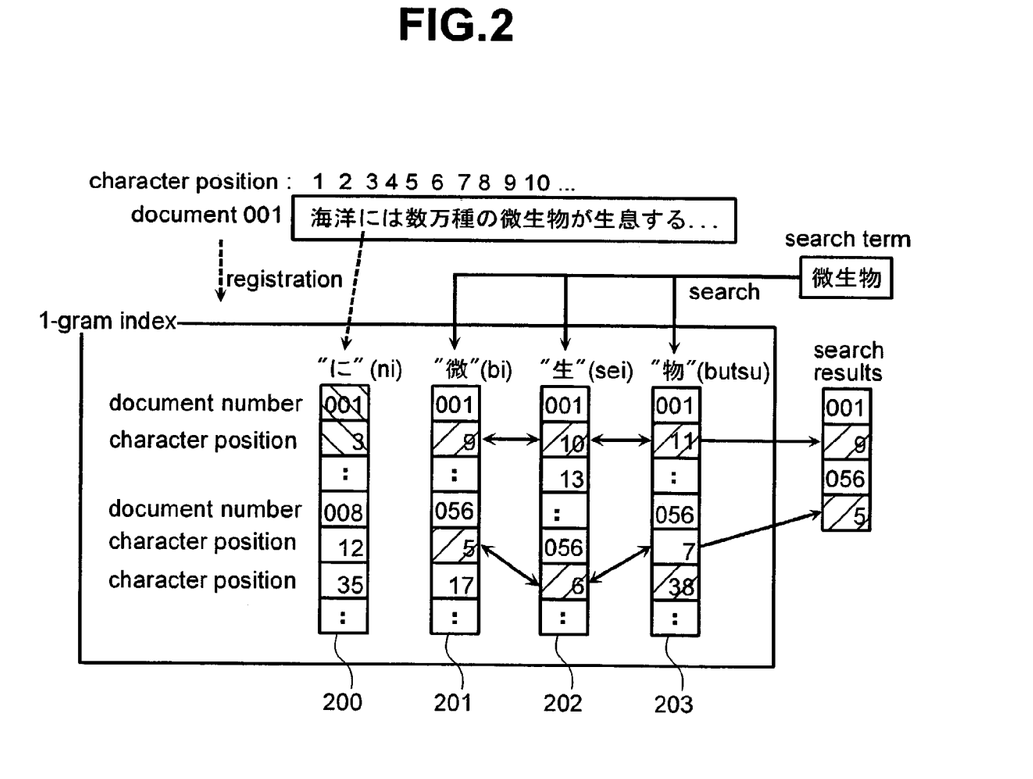
FIG. 2 is a diagram illustrating the n-gram indexing method.

FIG. 2 shows an example of a 1-gram indexing method.

Referring to the figure, in the n-gram indexing method, information about the position at which each n-gram (n=1 in the example shown in FIG. 2) appears in a document is stored in an index when a document is registered.

For example, the 1-gram ("ni") appears as character number '3' in the document '001'. Thus, the document number '001' and the character position '3' are stored in an index 200 corresponding to ("ni").

When a search is performed, an occurrence position for a search term is obtained by performing an adjacency evaluation of the occurrence positions in the indexes of the n-grams (n=1 in the example shown in FIG. 2) extracted from the specified search term.

For example, if("bi|sei|butsu") is specified as the search term, the 1-grams "bi", "sei", and "butsu" are extracted from the search term.

Then, occurrence position information for "bi|sei|butsu" is obtained by performing an adjacency evaluation using an index 201 corresponding to "bi", an index 202 corresponding to "sei", and an index 203 corresponding to "butsu".

In the example shown in the figure, "bi", "sei", and "butsu" are adjacent to each other starting with character '9' in document number '001'. The characters are also adjacent to each other starting with character '5' in document number '056'. This indicates that 'bi|sei|butsu' occurs at these positions.

As described above, the n-gram indexing method allows searching to be performed without scanning a document by simply loading indexes and performing adjacency evaluations based on occurrence position information. Thus, the method can be used to provide high-speed full-text searches even when implemented for large-scale document databases.

However, with the n-gram indexing method, using an n value of 1, i.e., using 1-gram indexing, the occurrence position information for individual 1-grams will be increased since each 1-gram will have a high frequency of occurrence, thus making the individual indexes large.

This results in slower loading of indexes as well as the number of adjacency evaluations that have to be performed based on the occurrence position information, thus causing the searching to be time consuming.

To provide high-speed searching, smaller indexes must be created using a higher value of n. However, indexes for smaller values of n must also be created to allow searching when short search terms are specified.

As a result, the total index size is increased.

Also, in indexing document retrieval methods, such as the n-gram indexing method, strings (n-grams, in the case of the n-gram indexing method) must be managed in a tree structure, such as the tries described in "Information Retrieval", by William B. Frakes, pp. 21–23.

Tries are tree structures created for sets of strings to be searched, i.e., key words (hereinafter referred to as key sets), where the common front sections of the key words (hereinafter referred to as keys) are delimited with common delimiters.

These tries are used when registering and retrieving documents. A string to be registered or a string contained in the search term is used as a key that is traversed in a trie to obtain pointer information indicating an index corresponding to the string.

Since the time required to search a trie is not dependent on the number of keys, tries can be used for large-scale databases to provide high-speed key word searches.

Figure 3:
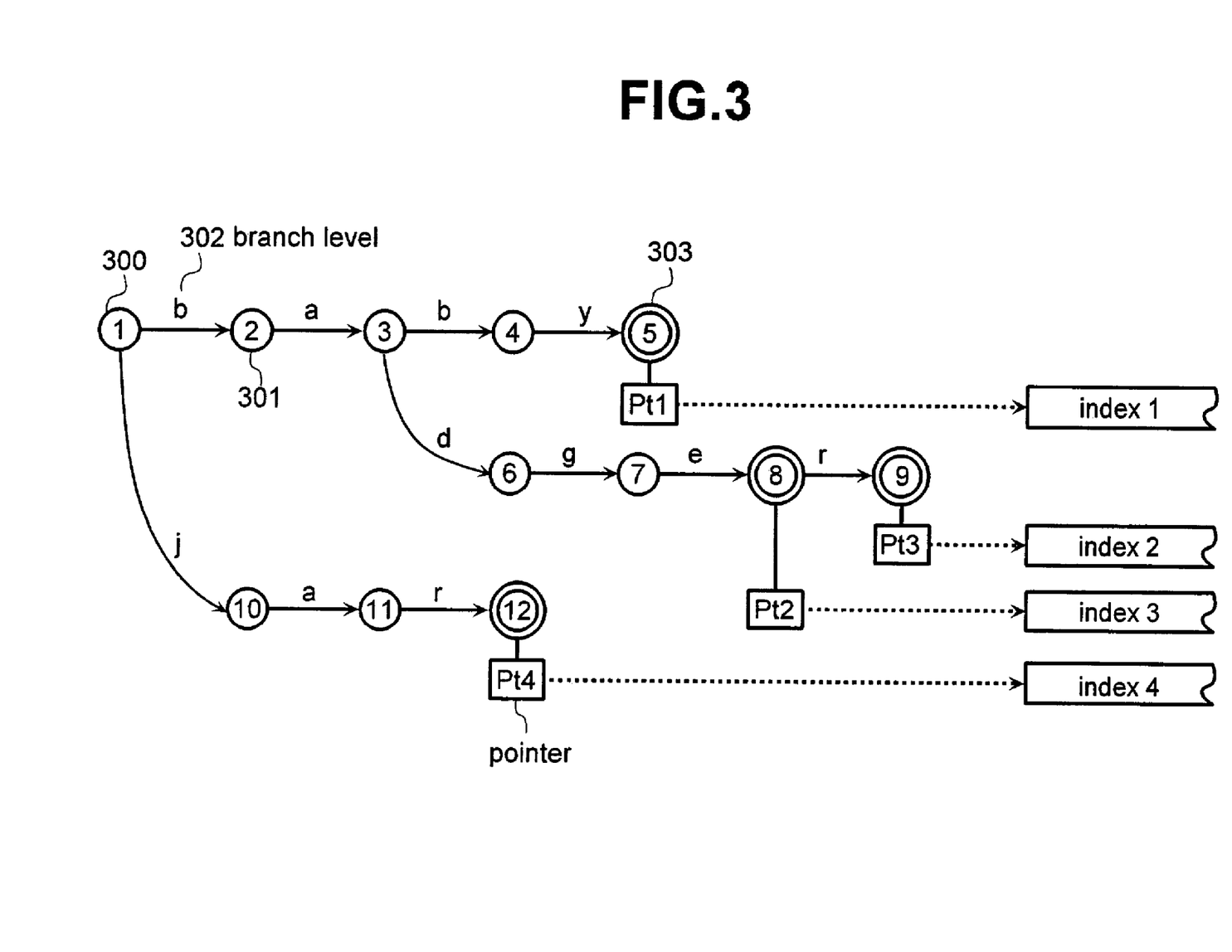
FIG. 3 is a diagram showing the structure of tries used in a conventional method.

FIG. 3 shows a trie corresponding to a key set of {baby, badge, badger, jar}.

In this trie, a branch label b (302) is defined from a node 1 (300) to a node 2 (301). At the node corresponding to the end of the key, indicated by double circles, pointer information for the index corresponding to the key is set up.

For example, if the specified search term is "baby", the trie in the figure is searched for the string "baby", and pointer information Pt1 set up at a node 5 (303) is obtained. The pointer information Pt1 points to where an index corresponding to the search term "baby" is stored.

When using these types of tries to manage n-grams for the n-gram indexing method, creating indexes with longer n-grams to keep individual indexes smaller and to make searches faster will result in an increased number of n-grams and trie nodes, leading to larger tries.

In order to overcome this problem of increased total index size and increased size in the tree structure that manages the index, Japanese laid-open patent publication number Hei 8-1947 18 (hereinafter referred to as conventional technology 1) discloses a method where, if an n-gram makes the index size exceed a certain reference value (hereinafter referred to as the reference index size), the value of n for the n-gram is increased and a smaller index is created. This provides a consistently light load for index loading and adjacency evaluations for occurrence position information, allowing high-speed searching, while also preventing increases in total index size and the size of the tree structures (hereinafter described for tries) used to manage the index.

Figure 4:
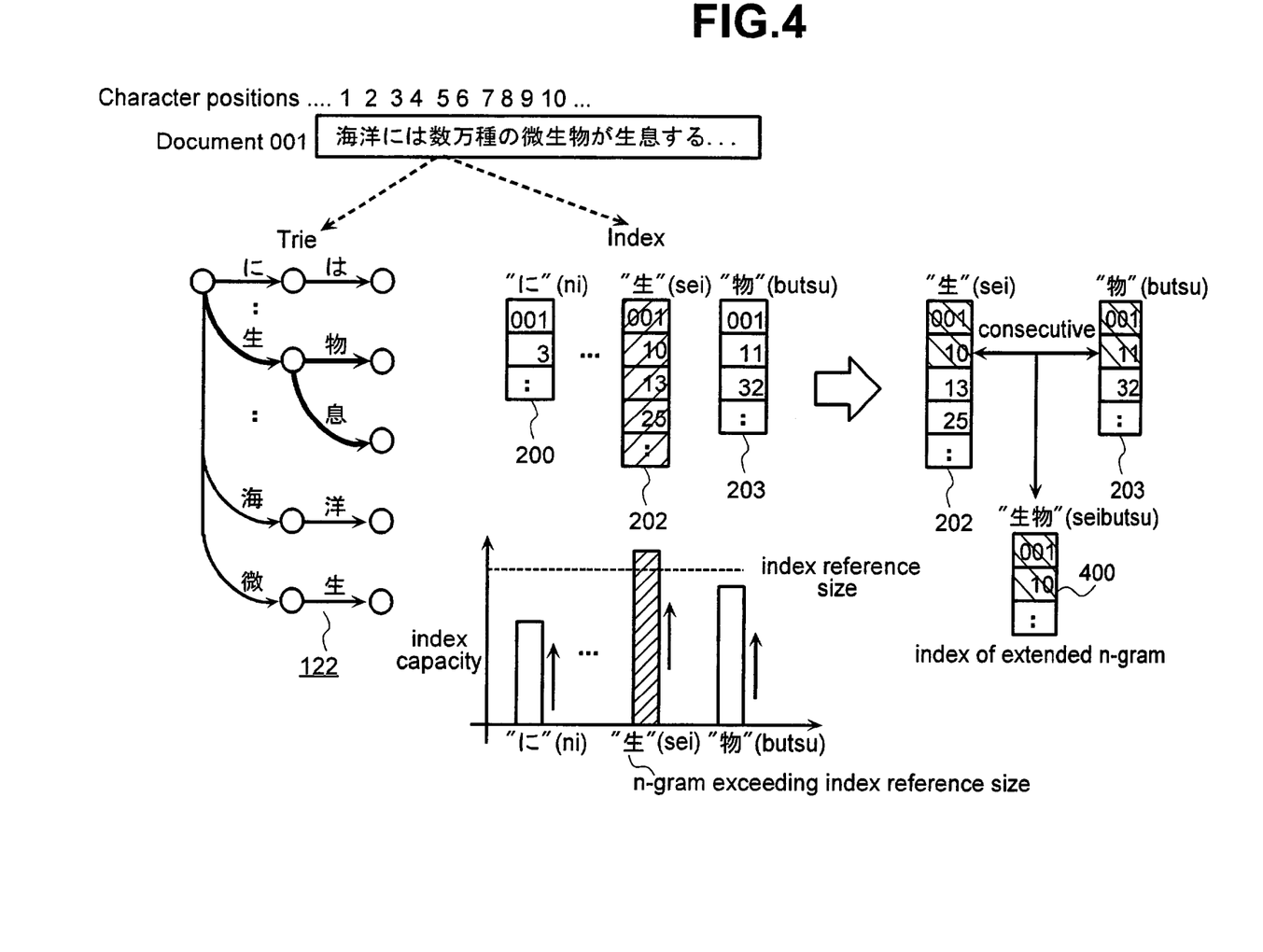
FIG. 4 is a diagram showing the operations performed in the conventional technology 1.

FIG. 4 provides an overview of the incremental n-gram indexing method disclosed in conventional technology 1.

When a document is registered in this method, an index of n-grams is created and connection information for two characters in the document is registered in a trie 122.

If the index size exceeds a reference index size as documents are being registered, an index is created for n-grams having one more character than the original n-gram (hereinafter referred to as an extended n-gram).

The following is a more specific description of the method used to create indexes, with reference to FIG. 4.

To create an extended n-gram with one more character than the original n-gram, the trie 122 is looked up and an n-gram that may continue from the original n-gram is retrieved.

Then, an adjacency evaluation is performed for the occurrence position information of the index for the retrieved n-gram (hereinafter referred to as a connection n-gram) and the index of n-grams that exceeded the reference index size (hereinafter referred to as the reference index surplus n-gram). This is used to create an index for extended n-grams.

In the example shown in this figure, the index corresponding to the 1-gram "sei" exceeds the reference index size, so "sei" becomes a reference index surplus n-gram.

First, the trie 122 is searched for "sei", and a connection n-gram following "sei" is obtained.

In the example shown in the figure, a search of the trie 122 determines that "butsu" and "soku" follow "sei".

Then, an adjacency evaluation is performed for the occurrence positions in the "sei" and "butsu" index and the "sei" and "soku" index. This results in the creation of an extended n-gram index 400, where one character is added to "sei", as in "sei|butsu" and "sei|soku".

As described above, by using conventional technology 1, extended n-grams having one more character than the original n-grams are created for large indexes that slow down searches. This provides a consistently low load for index loading and adjacency evaluations of occurrence position information, thus allowing high-speed searches to be performed.

For all other indexes, indexes for longer n-grams are not created, thus preventing increases in the total index size and the size of the tree structures (tries) used to manage n-grams.

SUMMARY OF THE INVENTION

In the n-gram indexing method disclosed in conventional technology 1 as described above, when an index is larger than a reference index size, making searching slower, high-speed searches are made possible by creating small indexes using keys consisting of an additional character added to the n-gram. This provides a consistently low load for index loading and adjacency evaluations of occurrence position information.

Also, for indexes that are smaller than the reference index size, no extra index using longer n-grams are not created. This makes it possible to prevent increases in the total index size or the tree structures (tries) used to manage n-grams.

However, in full-text searches that use the n-gram indexing method, it is possible that the specified search term to be searched is not treated as it is meant to be treated, leading to the retrieval of "noise" documents where the search term is contained as a subset of a different word.

For example, in a 2-gram indexing method where indexes are created for every two adjacent characters in registered documents, out of the string "denikilonisuilki", the strings "denjki", "kilon", "onlsui", and "suilki" will be extracted for the purpose of creating indexes.

Then, if "kilon" is specified as a search term, the search results will be obtained by looking up the 2-gram index corresponding to "kilon".

As a result, the search term "kijon" may not be handled as intended and may result in search results that include documents where the "ki" from the word "deniki" is adjacent to the "on" of the word "onjsuilki".

Conventionally, a word indexing method that uses morpheme analysis has been used to exclude "noise" documents where a specified search term is contained as a subset of a different word.

In this word indexing method, morpheme analysis is performed where, when a document is registered, the strings in this document are parsed into parts of speech, and a dictionary is used to extract significant words. Then, a search index is created for these significant words.

In this method, the string "den|kilon|sui|ki" in the document to be registered as described above causes only the word "den|kilon|sui|ki" to be extracted, and a search index is created for this.

Since "kilon" is not extracted as a word, no index is created for it. If "kilon" is specified as a search term, this document will be excluded and will not be retrieved.

However, a problem with this word indexing method is that words not entered in the dictionary (recent words, coined words, abbreviations, compound words, and the like) cannot be used in searches.

In other words, if the word "den|kilon|sui|ki" from the example above is not in the dictionary, indexing will not be performed for "den|kilon|sui|ki" and this document will not be retrieved if the search term "den|kilon|sui|ki" is specified.

In this manner, the n-gram indexing method and the word indexing method that uses morpheme analysis have opposite problems (if a search for a term that is not entered in the dictionary is performed, "noise" documents where the specified search term is contained as a subset of a different word will be retrieved).

Thus, in order to provide search functions that correspond to the purpose of the search, it is necessary to use the n-gram indexing method in conjunction with the morpheme-analysis word indexing method.

This would mean creating both n-gram and word indexes, requiring an expensive system with large indexes to provide adequate searches. Furthermore, registration and maintenance is made inefficient.

The object of the present invention is to provide a high-performance, inexpensive, and highly maintainable search system that allows the selective use, based on the purpose of a search, of free-word searches that allow searches of documents containing a specified search term without omission and of searches that consider word boundaries and that exclude documents from the search results when the specified search term exists in the document as the sub-string of a different word.

In order to achieve the object described above, the present invention provides a document retrieval method for a document retrieval system that retrieves documents containing a specified string out of a set of documents registered beforehand. This document retrieval method performs a word extraction operation for text data in a document to be registered, identifies top-of-word positions and bottom-of-word positions in the text data, and creates text data in which identification information indicating tops of words and ends of words are added to top-of-word characters and end-of-word characters, respectively. Then, an n-gram, which is a sub-string of a predetermined length, is extracted from the created text data. A search index containing information extracted from the extracted n-gram is then created and stored. The extracted information includes character position information extracted from the extracted n-gram, top-of-word boundary information if a leading character of the n-gram is at a leading position of a word and end-of-word boundary information if a trailing character of the n-gram is at a trailing position of a word. The character position information includes text identification information for the text data and occurrence position information within the text data.

DESCRIPTION OF THE PREFERRED EMBODIMENTS

Figure 1:
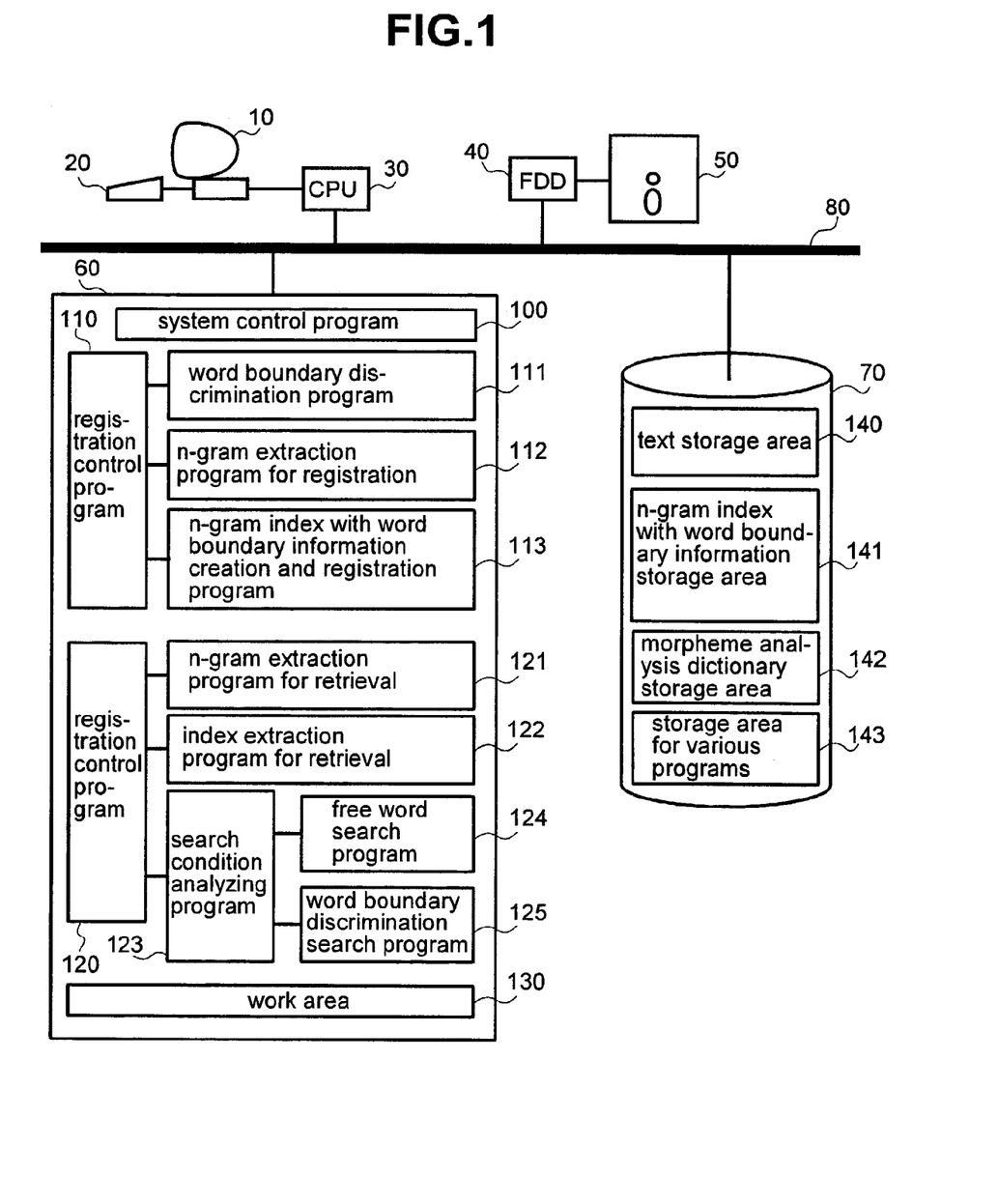
FIG. 1 is a schematic block diagram showing the architecture of a first embodiment of the present invention.

FIG. 1 shows the architecture of a first embodiment of a document retrieval 10 system.

In the document retrieval system shown in the figure, a display 10 displays search results, a keyboard 20 is used to enter registration and search commands, a central processing unit CPU 30 executes registration and searching operations, a floppy disk driver 40 loads data from floppy disks, a floppy disk SO stores document data to be registered in a database, a main memory 60 provides temporary storage of data and programs for registration and searching, a magnetic disk 70 stores various types of data and programs, and a bus 80 connects these elements.

In addition to a system control program 100, the main memory 60 loads the following programs from the magnetic disk 70 and stores them in a work area 130. A registration program 110, a word boundary discrimination program 111, an n-gram extraction program for registration 112, and an n-gram index with word boundary information creation and registration program 113 are programs used for registration. A search control program 120, an n-gram extraction for searches program 121, an index extraction for searches program 122, a search condition analyzing program 123, a free word search program 124, and a word boundary discrimination search program 125 are programs used for searches.

The magnetic disk 70 has a text storage area 140, an n-gram index with word boundary information storage area 141, a morpheme analysis dictionary storage area 142, and a program storage area 143 for various other programs.

The following is a summary description of the operations performed when registering documents in the document retrieval system according to this embodiment.

First, a registration command is entered using the keyboard 20, and the system control program 100 runs the registration control program 110, beginning the 10 registration operation for the documents. The operations performed for the registration of documents are described with reference to the PAD (Problem Analysis Diagram) shown in FIG. 5.

Figure 5:
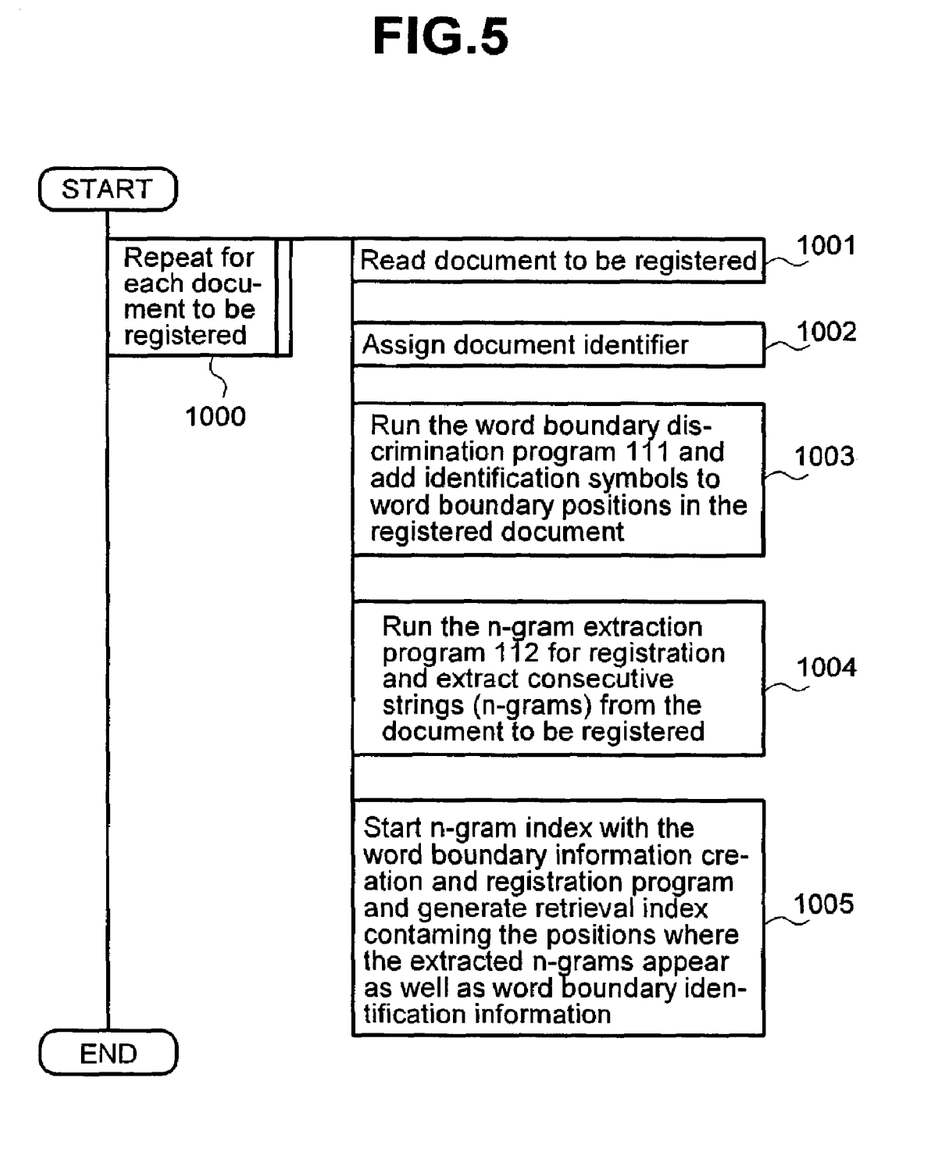
FIG. 5 is a flow diagram of operations performed during registration in the embodiment.

The operations from step 1001 to step 1005 are repeated for each document to be registered as stored in the floppy disk 50 (step 1000).

First, at step 1001, a single unprocessed document is selected out of the set of documents in the floppy disk 50 to be registered, and the selected document is loaded into the work area 130 of the main memory 60 via the floppy disk driver 40.

Next, at step 1002, a document identifier is assigned to the document to be registered that was loaded at step 1001. The document identifier is a number used to uniquely identify this document in the document database. The document to be registered is also stored in the text storage area 140 on the magnetic disk 70.

Then, at step 1003, the word boundary discrimination program 111 is executed on the document to be registered in the work area 130 of the main memory 60. By performing morpheme analysis while referring to the morpheme analysis dictionary 142 on the magnetic disk 70, words are extracted and identification symbols are added at the word boundary positions.

Then, at step 1004, the n-gram extraction for registration program 112 is run, and Sub-strings of a predetermined length (n-grams) are extracted from the document to be registered to serve as the strings for which to create the search index.

Finally, the n-gram index with word boundary information creation and registration program 113 and a search index is created. In addition to character position information for the n-grams extracted at step 1004, the search index contains information about top-of-word boundary identification information if the leading character of an n-gram corresponds to the leading boundary of a word and end-of-word boundary identification information if the trailing character of the n-gram corresponds to the trailing boundary of a word.

The index is then stored in the n-gram index with word boundary information storage area 141 in the magnetic disk 70.

The above is a summary description of the registration operations performed in this embodiment.

Next, a simple description of the operations performed at step 1003, step 1004, and step 1005 from FIG. 5 will be provided.

First, at step 1003, the word boundary discrimination program analyzes the contents of the document to be registered and extracts words. Text is generated with identifying symbols added to the start and end of each word, and the result is output to the work area 130.

In this embodiment, the extraction of words also uses a method based on morpheme analysis technology.

In the n-gram extraction operation for a registration performed at step 1004, sub strings of a predetermined length (n-grams) are extracted from the text in the work area 130 created at step 1003 and including top-of-word and end-of-word identifying symbols.

The lengths of the n-gram strings extracted here are very dependent on search performance and the size of the search index, but to facilitate the description, a method will be used in which each individual character is extracted from the documents to be registered (1-gram indexing method).

For 1-grams immediately following an identifying symbol indicating a top of a word and immediately preceding an identifying symbol indicating an end of word, symbols indicating this are added.

At step 1005, the n-gram index with word boundary information creation and registration program takes each of the individual characters (1-grams) extracted at step 1004 from the document to be registered and generates character position information. In the character position information, the document identifier of the document to be registered is stored in association with occurrence position information indicating the character positions within the document at which each 1-gram occurs.

Also, a search index is created, with the search index including top-of-word boundary identification information, if a 1-gram is positioned immediately after an identification symbol representing the top of a word, and also including end-of-word boundary identification information, if a 1-gram is positioned immediately before an identification symbol representing the end of a word.

Figure 6:
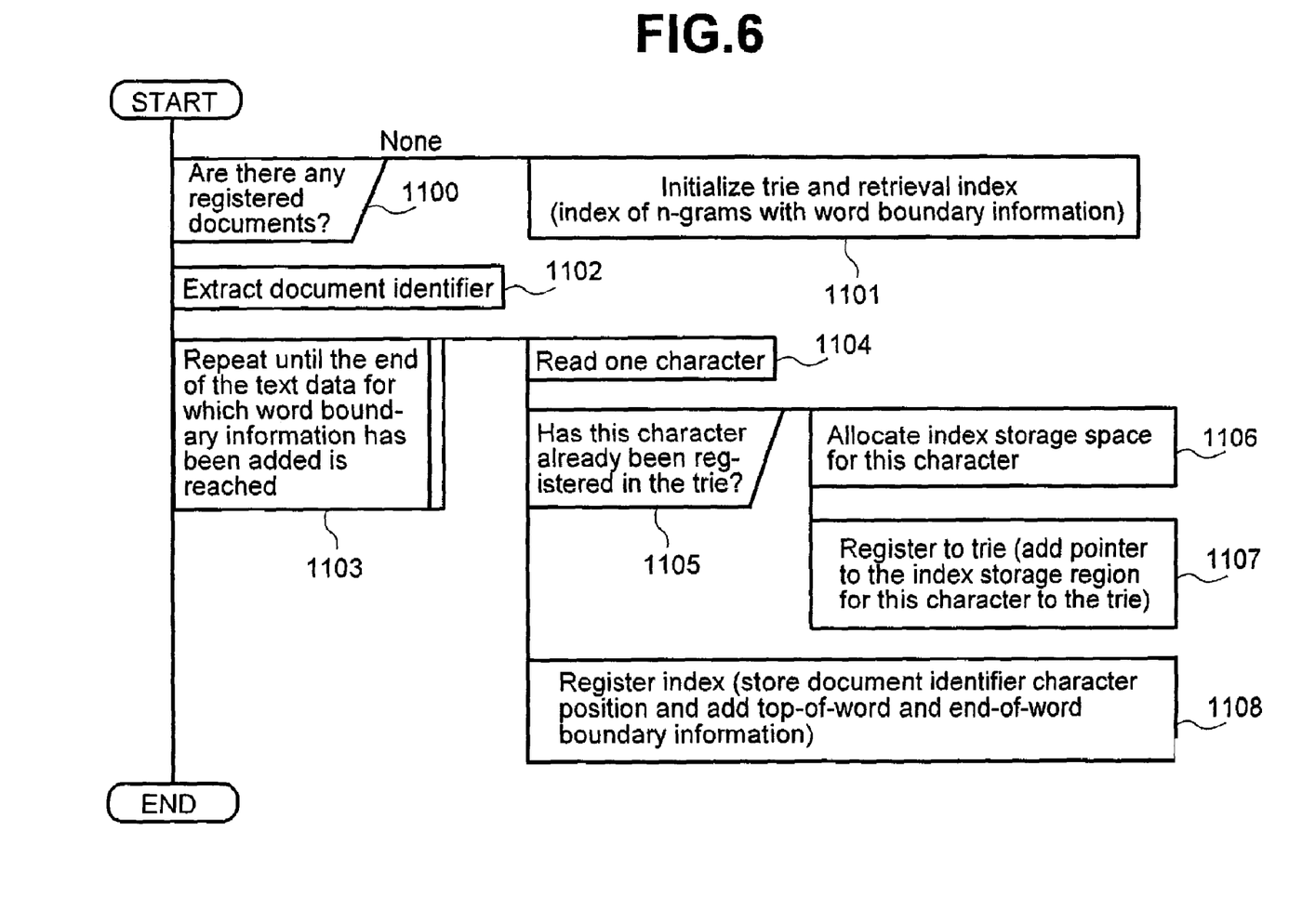
FIG. 6 is a diagram showing the flow of operations performed by an n-gram index with word boundary information creation and registration program.

The following is a description of the operations performed by this program, with reference to the PAD shown in FIG. 6.

Step 1100 checks to see if any documents have already been registered.

If there are no registered documents yet, step 1101 initializes tries and the search index (n-gram index with word boundary information).

Next, at step 1102, the document identifier is extracted from the document. Then, at step 1103, the series of operations from step 1104 through step 1108 is repeated from the start of the text data containing word boundary information to the end.

At step 1104, one character (a 1-gram) is read from the text data as the n-gram to be registered. Step 1105 checks to see if this character has already been registered in the trie.

If the character has not been registered in the trie, an index storage area for the character is allocated at step 1106. Then, at step 1107 the character is registered to the trie.

At step 1108, the document identifier for the document and the character position are stored at the end of the index storage area for that character, and if the is character is at a top-of-word boundary, a "1" is added to top-of-word boundary flag.

If the character is at an end-of-word boundary, a "1" is added to the end-of-word boundary flag. This creates a search index (an n-gram index with word boundary information), and this index is stored in the n-gram index with word boundary information storage area 141 in the magnetic disk 70.

The above is a description of the operations performed at step 1003, step 1004, and step 1005 in this embodiment.

The following is a description of the specific operations performed when documents are registered in this embodiment, using a document containing the text "shin|gata no den|kilon|su|ki wo kai|hatsu shita" as an example.

In this example, only one document is registered so the loop at step 1000 in the PAD from FIG. 5 will be performed only once for this document.

First, at step 1001 in the PAD from FIG. 5, the text data "shin|gata no den|kilon|su|ki wo kai|hatsu shita" is loaded into the work area 130 of the main memory 60.

Then, at step 1002 in the PAD from FIG. 5, a document identifier 001 is assigned to the document to be registered to allow it to be uniquely identified in the database.

Next, at step 1003 in the PAD from FIG. 5, the morpheme analysis dictionary is looked up to identify "shin|gata", "den|kilon|su|ki", and "kai|hatsu" as words.

Figure 7:
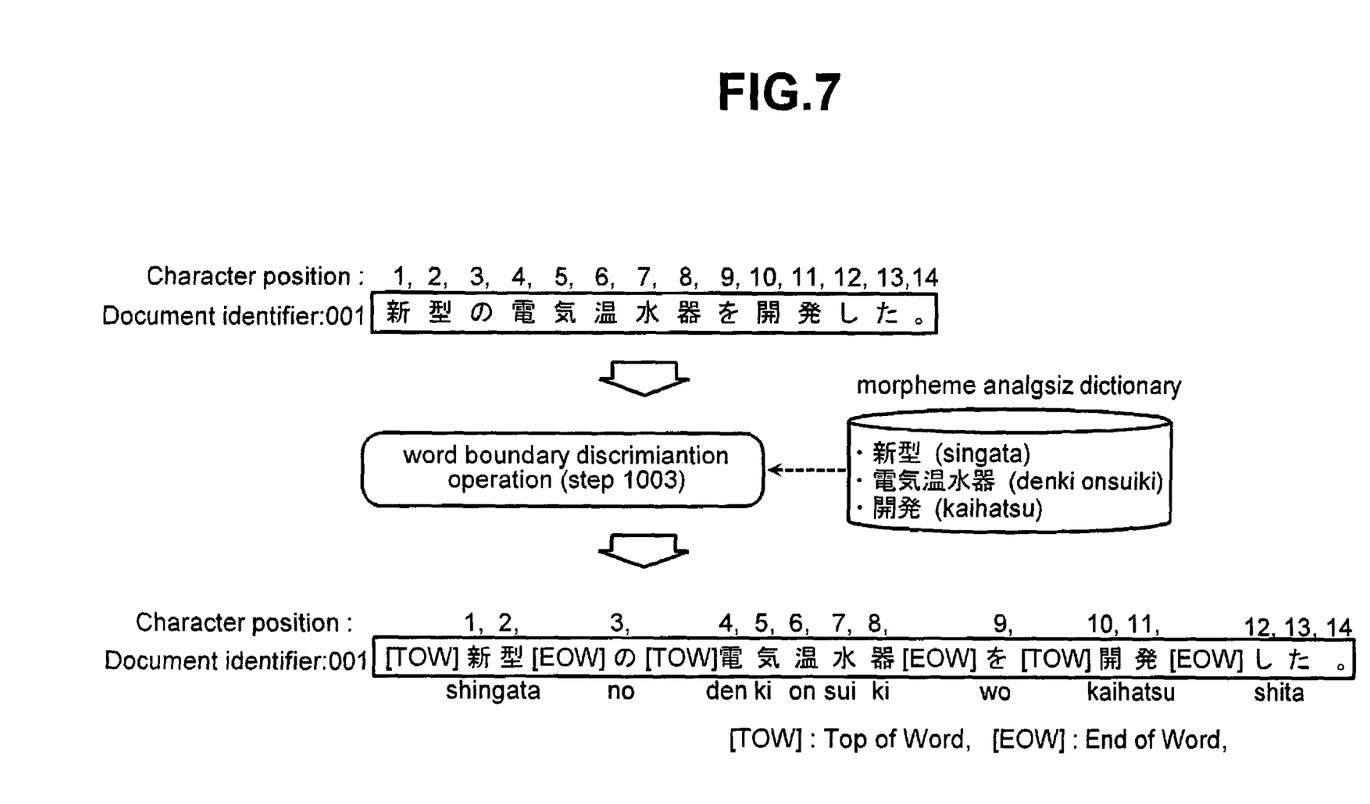
FIG. 7 is a diagram showing an example of the registration operation (word boundary discrimination operation) performed in the embodiment.

Then, as shown in FIG. 7, an identification symbol "[TOW]" (abbreviation of "Top Of Word"), indicating the top of a word, and an identification symbol "[EOW]" (abbreviation "End Of Word"), indicating the end of a word, are added to the tops and ends of the words and this is stored in the work area 130 of the main memory 60.

Figure 8:
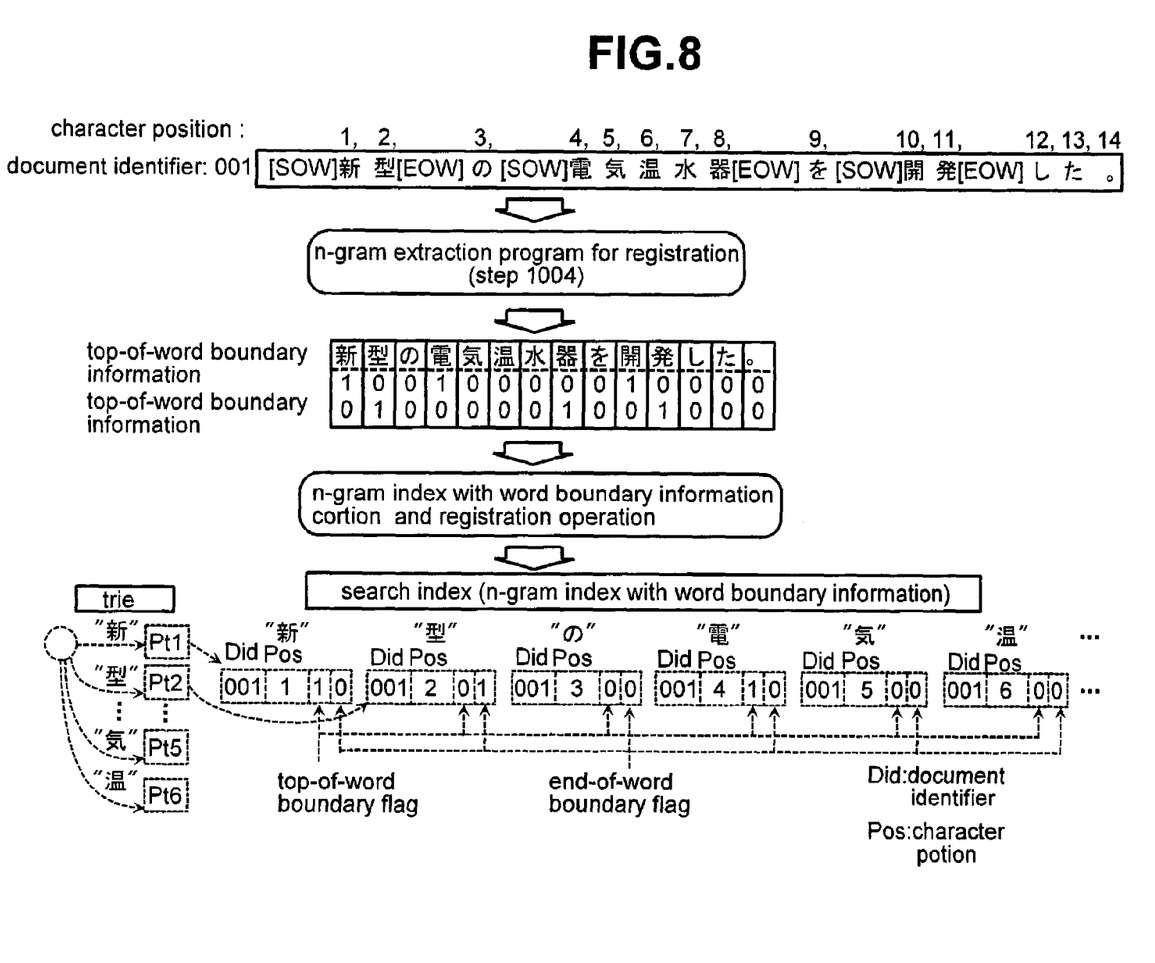
FIG. 8 is a diagram showing an example of a registration operation (n-gram extraction operation for registration and n-gram index with word boundary information creation and registration operation) performed in the embodiment.

Furthermore, as shown in FIG. 8, at step 1004 each of the individual characters, i.e., "shin", "gata", "no", "den", "ki", "on", "sui", "ki", "wo", . . . , are extracted from the text data to which word boundary information was added at step 1003. These characters serve as the n-grams to be registered.

Then, top-of-word boundary information is added to the characters following top-of-word boundaries, i.e., "shin", "den", and "kai". Also, end-of-word boundary information is added to the characters preceding end-of-word boundaries, i.e., "gata", "ki", and "hatsu".

Finally, at step 1005, a search index (the n-gram index with word boundary information) and a trie are created by saving occurrence position information, consisting of the document identifier (Did) and the character position (Pos) within the document, for the n-gram extracted at step 1004 and by adding word boundary flags.

First, step 1100 in the PAD from FIG. 6 is executed, but at this point there are no registered documents so the evaluation at step 1100 is "no", and step 1101 initializes the trie as well as the n-gram index with word boundary information.

Then, at step 1102, the document identifier "001" is extracted from the document to be registered.

Next, in the first loop for step 1103, the first character "shin" is extracted at step 1104.

At this point, since "shin" has not been registered yet, the evaluation result at step 1105 is "unregistered". At step 1106, an index area is allocated for "shin", and a pointer "Pt1" pointing to this index is registered in the trie at step 1107.

Then, at step 1108, an index is created by saving "001" as the document identifier Did, saving "2" as the character position Pos, and by adding a "1" to the top-of-word boundary flag and a "0" to the end-of-word boundary flag.

Next, in the second loop for step 1103, the second character "gata" is extracted at step 1104.

Since "gata" has not been registered at this point, the evaluation result at step 1105 is "unregistered". At step 1106, an index area is allocated for "gata", and a pointer "Pt2" pointing to this index is registered in the trie at step 1107.

Then, at step 1108, an index is created by saving "001" as the document identifier Did, saving "2" as the character position Pos, and by adding a "0" to the top-of-word boundary flag and a "1" to the end-of-word boundary flag.

Similar operations are repeated for all of the text data to create a trie and a search index (n-gram index with word boundary information) as shown in FIG. 8.

The registration operation is completed by storing the trie and the index in the n-gram index with word boundary information storage area 141 on the magnetic disk 70.

The above is a description of the operations performed during registration in this embodiment.

The following is a description of the operations performed during searching.

In the document retrieval system according to this embodiment, a search command is received from a user via a network, and the system control program 100 runs a search control program 120 to begin a document search operation.

Figure 9:
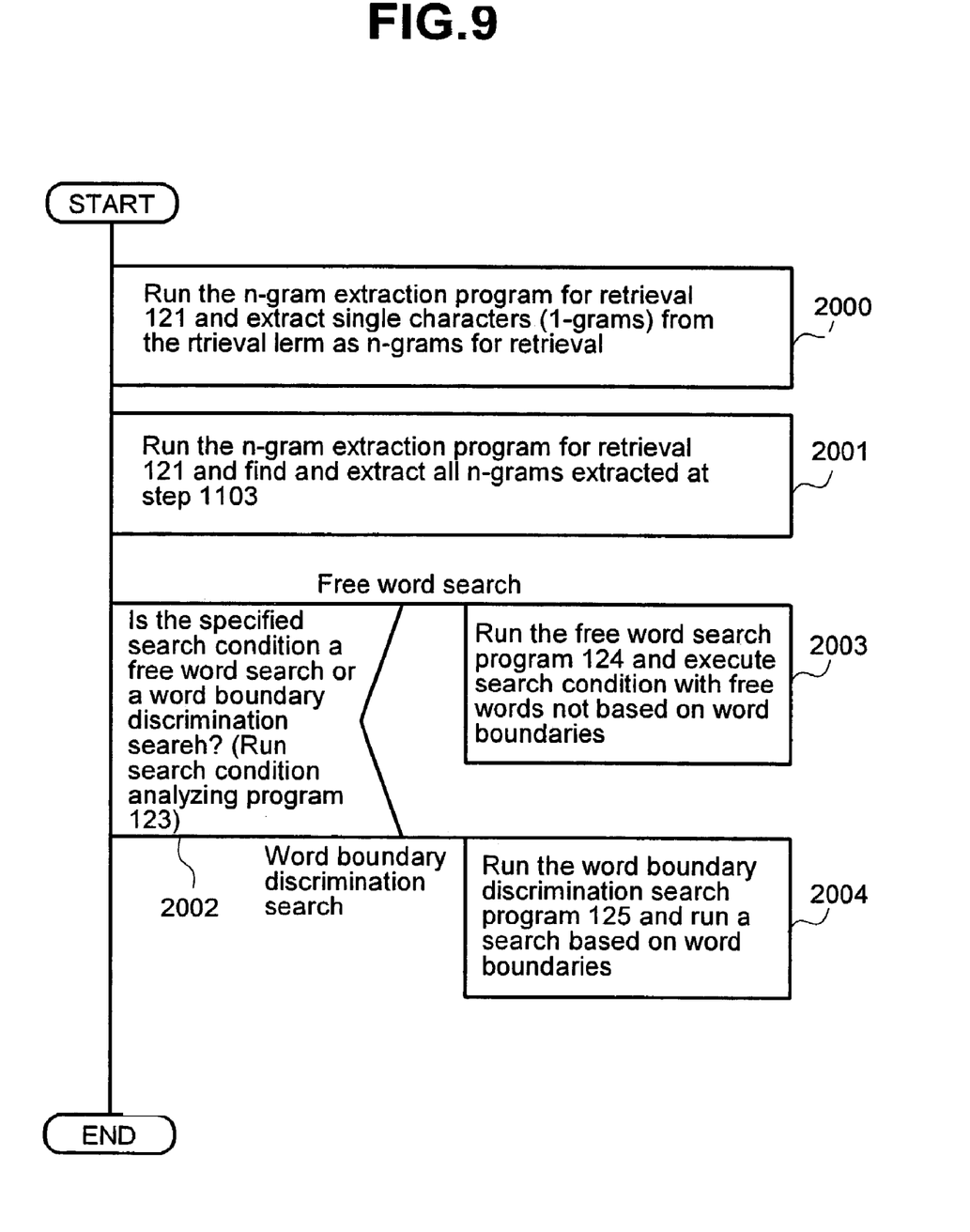
FIG. 9 is a flow diagram of operations performed in a search operation in the embodiment.

The following is a description of the operations performed during searching, with references to the PAD shown in FIG. 9.

First, at step 2000 the search control program 120 executes the n-gram extraction for searches program 121 and extracts n-grams for searches by extracting each individual character (1-grams) from the specified search term.

Next, at step 2001, the search index extraction program 122 is executed. The search index (the n-gram index with word boundary identification information) is looked up for each of the 1-grams extracted at step 2000, and the index data needed for performing the search is extracted.

Then, the search condition analyzing program 123 is executed at step 2002 and the search is analyzed to determine if it is a free-word search that does not consider word boundaries or whether it is a word boundary discrimination search that considers word boundaries.

Then, if the specified search condition is for a free-word search, the free-word search program 124 is executed at step 2003 to perform a free-word search that does not consider word boundaries.

If the specified search condition is a word boundary discrimination search, the word boundary discrimination search program 125 is executed at step 2004 to perform a search that considers word boundaries.

Finally, the search control program 120 returns the search results obtained from these operations to the user via the system control program 100, thus completing the searching operation.

The above is a summary of the search operation performed in this embodiment.

The following is a simple description of the operations performed at step 2003 and step 2004 shown in FIG. 9.

First, in the free-word search program 124 at step 2003, documents containing the specified search term are retrieved without referring to top-of-word and end-of-word boundary flags, as described for the conventional technology (conventional technology 1, for example).

More specifically, searching is performed by looking up the index data for each n-gram, i.e., the document identifier and character position, and extracting documents in which each n-gram is present and arranged identically as the search term.

In addition to the free-word searching operations performed at step 2003, the word boundary discrimination search program 125 at step 2004 performs an evaluation that uses the top-of-word and end-of-word boundary flags.

The word boundary discrimination searches that are considered here include searches that match the front of a word (e.g., if "ki|on" is specified as the search term, documents containing "ki|on|sa", "ki|on|hen|ka", and the like are retrieved), match the end of a word (e.g., if "ki|on" is specified as the search term, documents containing "gai|ki|on", "hei|kin|ki|on", and the like are retrieved), and match the entire word (e.g., if "ki|on" is specified as the search term, only documents containing "ki|on" are retrieved).

Searches that consider word boundaries are provided by performing the following operations. For searches that match the front of a word, only entries where the top-of-word boundary flag is set to "1" for the n-gram extracted at the start of the search term are extracted. For searches that match the end of a word, only entries where the end-of-word boundary flag is set to "1" for the n-gram extracted at the end of the search term are extracted. For searches that match the whole word, only entries where both flags are set to "1" are extracted.

The above is a description of the operations performed during searching.

Next, search operations with specific examples of different search conditions will be described.

Figure 10:
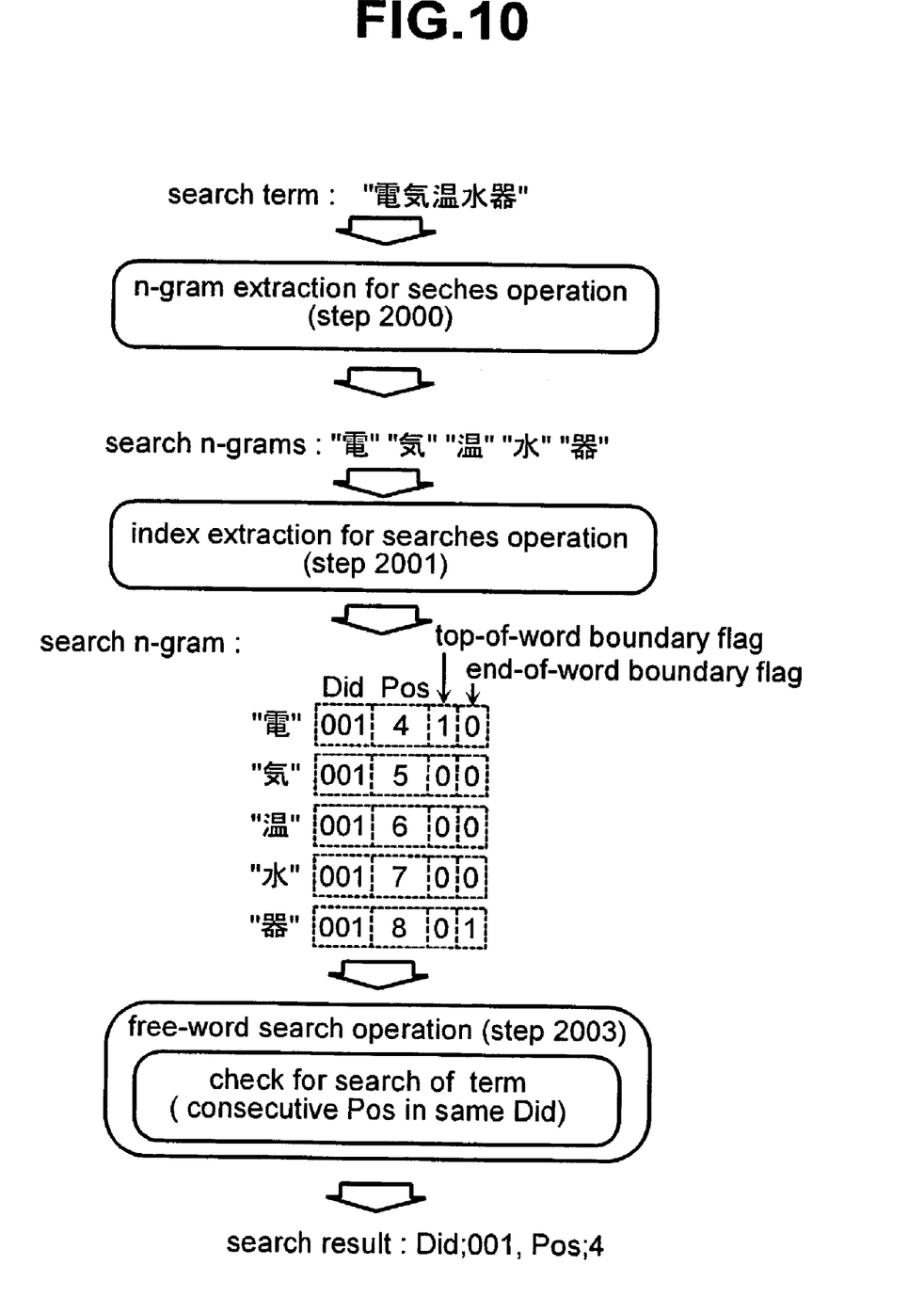
FIG. 10 is a diagram showing an example (1) of the search operation in the embodiment.
Figure 11:
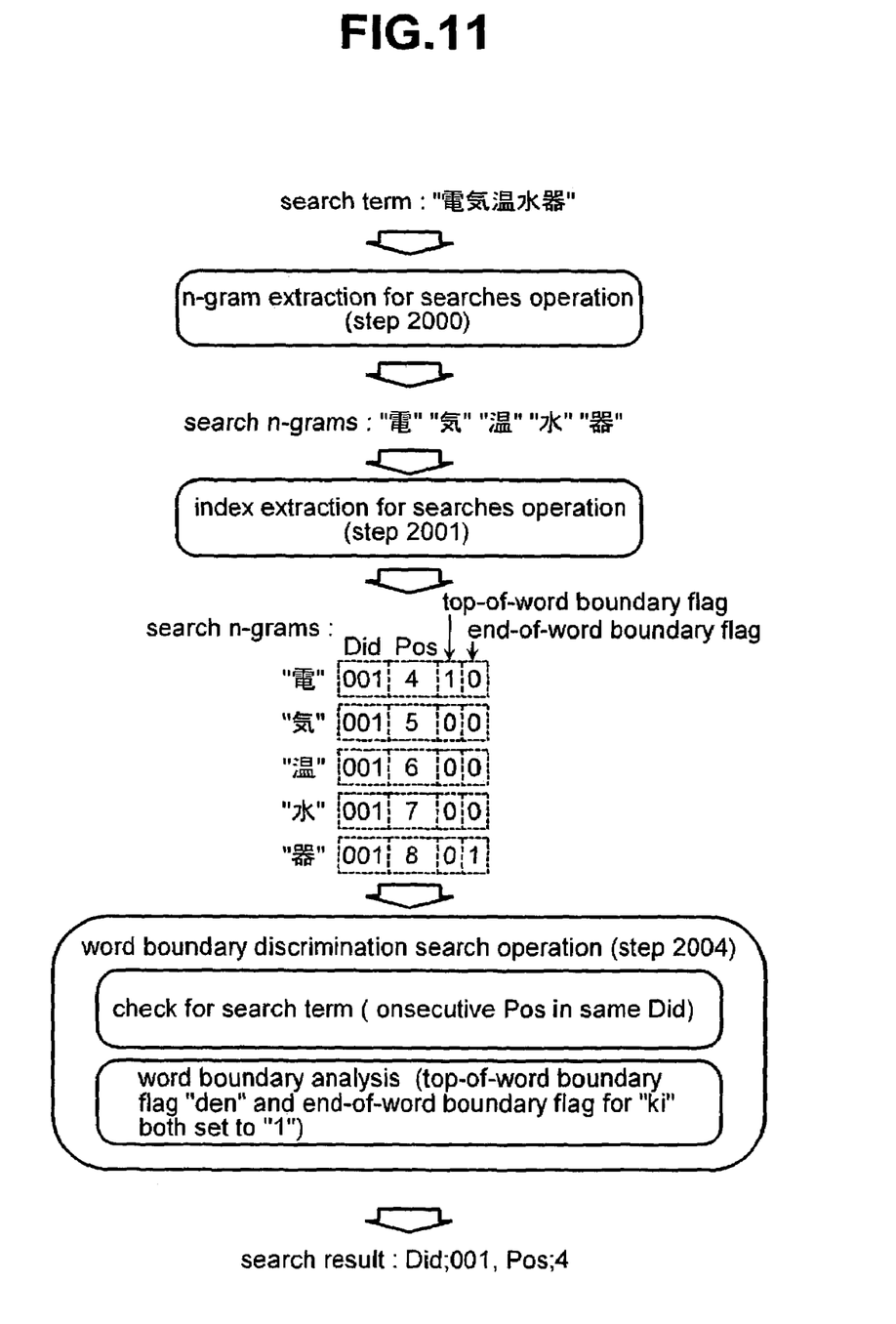
FIG. 11 is a diagram showing an example (2) of the search operation in the embodiment.

First, an example will be described, with reference to FIG. 10, of a free-word search on the trie and the search index shown in FIG. 8 using "den|ki|on|sui|ki" as the search term.

First, in step 2000 from the PAD shown in FIG. 9, the n-gram extraction for searches operation is performed to extract each of the 1-grams from the search term "den|ki|on|sui|ki", i.e., "den", "ki" "on", "sui", and "ki".

Then, the index extraction for searches operation is performed at step 2001 to extract index data corresponding to "den", "ki", "on", "sui", and "ki" from the trie shown in FIG. 8.

Then, since this example involves a free-word search as the search condition, the evaluation result for step 2002 will be "free-word search", and the word boundary discrimination search operation will be executed at step 2004.

In this operation, the index data for "den", "ki", "on", "sui", and "ki" are evaluated to find entries with the same document identifier (Did) and in which the character positions (Pos) are adjacent and in sequence. As a result, it is determined that the specified search term can be found at character position 4 in the document having a document identifier Did of 001.

Then, a word boundary evaluation operation is performed to extract entries where the leading n-gram "den" extracted from the search term "den|ki|on|sui|ki" has a top-of-word boundary flag set to "1" and where the trailing n-gram "ki" has an end-of-word boundary flag set to "1". The character position 4 of the document having the document identifier Did of 001 is then output as the search result.

Figure 12:
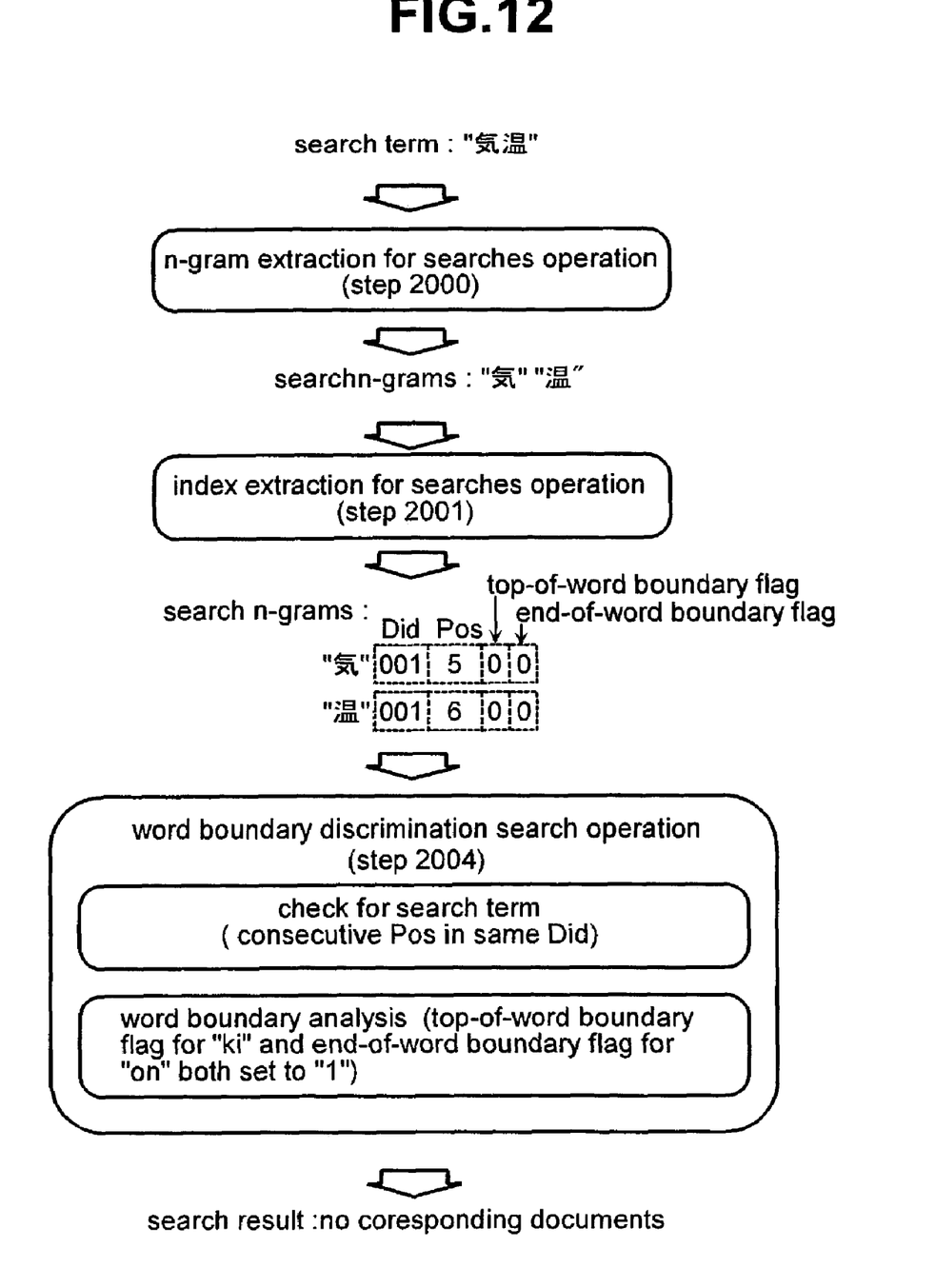
FIG. 12 is a diagram showing an example (3) of the search operation in the embodiment.

The following is a description, with reference to FIG. 12, of an example where 10 a search matching a complete word is performed on the trie and the search index shown in FIG. 8, as in the example above, using the search term "ki|on".

First, at step 2000 and step 2001 from the PAD shown in FIG. 9, an operation for extracting n-grams for searches and an operation for extracting indexes for searches are performed, and index data corresponding to "ki" and "on" are extracted is from the trie and the search index shown in FIG. 8.

Next, step 2002 performs the operation for analyzing the search condition. In this example, the search condition is for a search matching complete words (word boundary discrimination search), so the result of the analysis will be "word boundary discrimination search", and the word boundary discrimination search operation at step 2004 will be executed.

In this operation, the index data for "ki" and "on" are evaluated to determine if there are entries having identical document identifiers (Did) and~in which the character positions (Pos) are consecutive and sequential. This evaluation determines that the specified search term is present at character position 5 in the document having the document identifier Did 001.

In the word boundary evaluation operation, entries where the leading n-gram "ki" extracted from the search term "ki|on" has a top-of-word boundary flag set to "1" and where the trailing n-gram "on" has an end-of-word boundary flag set to "1". In this case, these flags are both set to "0" so this is not output as the search result.

The above is a description of the operations performed during document searches in this embodiment.

In this manner, when a document is to be registered, the present invention creates a search index by performing a morpheme analysis operation on the document to be registered and identifying word boundaries. Also, a top-of-word boundary flag, indicating if an n-gram is at a top-of-word boundary, and an end-of-word boundary flag, indicating if an n-gram is at an end-of-word boundary, are included in the search index.

When a search is performed, if the search condition is a word boundary discrimination search that considers word boundaries, the word boundary discrimination search (searches matching the front of a word, searches matching the end of a word, searches matching complete words) can be performed by using the top-of-word flag relating to the n-gram extracted at the start of the search term and the end-of-word flag relating to the n-gram extracted at the end of the search term.

This example was described with the assumption that the word "den|ki|on|sui|ki" is entered in the morpheme analysis dictionary.

However, even if the words "den|ki" and "on|sui|ki" are entered in the dictionary but the compound word "den|ki|sui|on|ki" is not entered in the dictionary when the document is registered, the "den" of "den|kij|sui|on|ki" will be at the top-of-word boundary of the word "deniki" in "den|ki|sui|on|ki", and "ki" will be at the end-of-word boundary of the word "sui|on|ki" of "den|ki|sui|on|ki". Thus, it is possible to perform complete-word matching searches for the compound word search term "den|ki|sui|on|ki".

In this embodiment, the data in the text storage area 140 and the n-gram index with word boundary information storage area 141 of the magnetic disk 70 is updated for each item registered. However, it would also be possible to use a method where the text and the n-gram with word boundary information index are created in the work area 180 of the main memory 60 for all the documents to be registered, after which all the data is written at once to the magnetic disk 70.

Also, in this embodiment, the word boundary discrimination program 111 performs morpheme analysis operations, but it would also be possible to use a method where strings are extracted by mechanically looking up a dictionary of words starting from the start of a document and working sequentially. For example, it would be possible to use a method where information about character types, e.g., kanji characters, katakana characters, hiragana characters, numerals, symbols, and alphabetical characters, are used to divide words. For example, strings in which the characters of the same type, e.g., kanji characters, katakana characters, alphabetical characters, are arranged consecutively can be extracted as words.

In the document retrieval method based on this method, an occurrence frequency is calculated for an n-gram extracted from a predetermined document. Also, the number of times the character type changes before this n-gram is calculated and the number of times the character type changes after this n-gram is calculated. Based on this, the probability that a change in character type will occur before each n-gram and the probability that a change in character type will occur after each n-gram is calculated, and these are set up as the preceding character type boundary probability and the subsequent character type boundary probability.

When a document is registered, the n-grams before and after each character position in the document being registered are extracted, and word boundaries are determined based on the subsequent character type boundary probability of the preceding n-gram and the preceding character type boundary probability of the subsequent n-gram.

Furthermore, in this embodiment, a 1-gram indexing method is described in which each individual character is extracted from the documents to be registered by the n-gram extraction for registration program 112 and from the search term by the n-gram extraction for searches program 122. It would also be possible, of course, to to apply the search function disclosed in the present invention for standard n-gram indexing methods where strings of predetermined lengths of at least one character are used to create search indexes.

It would also be possible, as in the conventional technology 1, to use an incremental n-gram indexing method that dynamically changes the length of the substrings (n-gram lengths) used to create search indexes based on the frequency of occurrence in the database.

In this embodiment, the search program and the registration program are stored in the miscellaneous program storage area 143 on the magnetic disk 70, but it would also be possible to use other secondary storage devices such as magneto-optical disk devices.

Furthermore, it would also be possible to store data on a portable medium such as a CD-ROM and to have the data read from a CD-ROM drive (not shown in the figures) when necessary.

Also, as the embodiment described above makes clear, the program for registration and the program for searching can operate independently. Thus, these programs can be stored on separate media and it would also be possible to have these programs running on separate computer systems or CPUs.

The present invention provides a high-performance, inexpensive, and highly maintainable search system that allows the selective use, based on the purpose of a search, of free-word searches that allow searches of documents containing a specified search term without omission and of searches that consider word boundaries and that exclude documents from the search results when the specified search term exists in the document as the substring of a different word.

What is claimed is:

1. A document retrieval method for a document retrieval system that retrieves documents containing a specified string out of a set of documents registered beforehand, said document retrieval method comprising the steps of:

extracting an n-gram, which is a sub-string having a predetermined length from a specified search term;

extracting index data for said n-gram including text identification information, occurrence position information which indicates that the string is located at the n-th position from the beginning of said text data, top-of-word boundary information, and end-of-word boundary information; and searching documents without omission containing said specified search term using at least one of the group consisting of said text identification information, said occurrence position information, and top-of-word boundary information or end-of-word boundary information from an extracted index, while excluding, as "noise", documents containing said specified search term as a subset of a different word, wherein a specified search condition is analyzed to identify whether said specified search condition is for a free-word search performing a search without omissions of documents containing said specified search term or is for a word boundary discrimination search that considers word boundaries and excludes a document if said specified search term exists in said document as a sub-string within a different word, wherein if the result of said analysis is a free-word search, then all documents containing said specified search term are searched without omission based on text identification information and occurrence position from an index extracted in said search index extracting step, and wherein if the result of said analysis is a word-discrimination search, then all documents containing said specified search term are searched without omission while excluding, as "noise", documents containing said specified search string as a sub-string of a different word, said searching being performed using at least one of the group consisting of text identification information, occurrence position information, and top-of-word boundary identification information or end-of-word boundary identification information from an index extracted in said search index extracting step.

2. A document retrieval method as described in claim 1, wherein said word extraction operation uses at least one selected from the group consisting of:

a dictionary of words for morpheme analysis;

character type information for at least two types selected from the group consisting of kanji, katakana, hiragana, numerals, alphabetical characters, and symbols; and character type boundary probability in which frequencies of occurrence of changes in character types preceding and subsequent to a sub-string having a predetermined length are statistically accumulated.

3. A document retrieval system for retrieving documents containing a specified string out of a set of documents registered beforehand, said document retrieval system comprising:

means for extracting n-grams for searches extracting sub-strings (n-grams) of a predetermined length from a specified search term;

means for extracting indexes for searches extracting index data including text identification information, occurrence position information which indicates that the string is located at the n-th position from the beginning of said text data, top-of-word boundary identification information and end-of-word boundary identification information for said n-gram;

means for analyzing search conditions analyzing a specified search condition to determine if said specified search condition is for a free-word search performing a search without omissions of documents containing said specified search term or is for a word boundary discrimination search that considers word boundaries and excludes a document if said specified search term exists in said document as a sub-string within a different word;

means for performing free-word searches searching all documents containing said specified search term without omission based on said text identification information and occurrence position information in an index extracted by said search index extracting means if the result of said analysis is a free-word search; and means for performing word-discrimination searches searching all documents containing said specified search term without omission while excluding, as "noise", documents containing said specified search string as a substring of a different word if the result of said analysis is a word-discrimination search, said searching being performed using at least one of the group consisting of text identification information, occurrence position information, and top-of-word boundary identification information or end-of-word boundary identification information from an index extracted by said search index extracting means.

4. A document retrieval system that retrieves documents containing a specified string out of a set of documents registered beforehand, said document retrieval system comprising:

a memory for storing programs and data; and a processor for executing said programs and processing said data stored in said memory, wherein said processor upon executing said programs and processing said data causes said document retrieval system to perform the steps of:

extracting an n-gram, which is a sub-string having a predetermined length from a specified search term, extracting index data for said n-gram including text identification information, occurrence position information which indicates that the string is located at the n-th position from the beginning of said text data, top-of-word boundary information, and end-of-word boundary information, and searching documents without omission containing said specified search term using at least one of the group consisting of said text identification information, said occurrence position information, and top-of-word boundary information or end-of-word boundary information from an extracted index, while excluding, as "noise", documents containing said specified search term as a subset of a different word, wherein a specified search condition is analyzed to identify whether said specified search condition is for a free-word search performing a search without omissions of documents containing said specified search term or is for a word boundary discrimination search that considers word boundaries and excludes a document if said specified search term exists in said document as a sub-string within a different word, wherein if the result of said analysis is a free-word search, then all documents containing said specified search term are searched without omission based on text identification information and occurrence position from an index extracted in said search index extracting step, and wherein if the result of said analysis is a word-discrimination search, then all documents containing said specified search term are searched without omission while excluding, as "noise", documents containing said specified search string as a sub-string of a different word, said searching being performed using at least one of the group consisting of text identification information, occurrence position information, and top-of-word boundary identification information or end-of-word boundary identification information from an index extracted in said search index extracting step.

* * * * *